(12) United States Patent
Kiran (10) Patent No.: US 11,376,769 B2
(45) Date of Patent: Jul. 5, 2022

(54) EXPANDABLE FOAMING MOLDS AND APPLICATIONS THEREOF

(71) Applicant: Erdogan Kiran, Blacksburg, VA (US)

(72) Inventor: Erdogan Kiran, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 61 days.

(21) Appl. No.: 16/865,637

(22) Filed: May 4, 2020

(65) Prior Publication Data

US 2020/0346377 A1 Nov. 5, 2020

Related U.S. Application Data

(60) Provisional application No. 62/842,965, filed on May 3, 2019.

(51) Int. Cl.

| | |
|---|---|
| *B29C 44/34* | (2006.01) |
| *B29C 44/42* | (2006.01) |
| *B29C 44/60* | (2006.01) |
| *B29C 33/42* | (2006.01) |
| *B29C 33/38* | (2006.01) |
| *B29C 33/56* | (2006.01) |
| *B29C 33/00* | (2006.01) |
| *B30B 11/04* | (2006.01) |
| *B29C 44/58* | (2006.01) |
| *B29C 43/36* | (2006.01) |
| *B29C 43/32* | (2006.01) |

(52) U.S. Cl.
CPC ...... *B29C 44/3496* (2013.01); *B29C 33/0038* (2013.01); *B29C 33/38* (2013.01); *B29C 33/42* (2013.01); *B29C 33/56* (2013.01); *B29C 44/351* (2013.01); *B29C 44/428* (2013.01); *B29C 44/585* (2013.01); *B29C 44/60* (2013.01); *B30B 11/04* (2013.01); *B29C 2043/3255* (2013.01); *B29C 2043/3628* (2013.01); *B29K 2827/18* (2013.01); *B29K 2871/00* (2013.01); *B29K 2905/02* (2013.01); *B29K 2905/12* (2013.01)

(58) Field of Classification Search
CPC .... B29C 2043/3628; B29C 2043/3255; B30B 11/04; B30B 11/02
See application file for complete search history.

(56) References Cited

U.S. PATENT DOCUMENTS

| | | | | |
|---|---|---|---|---|
| 1,896,372 | A * | 2/1933 | Rieser | B29C 43/36 425/414 |
| 2,336,982 | A * | 12/1943 | Dorland | B30B 11/02 425/78 |
| 2,562,876 | A * | 8/1951 | Baeza | B30B 11/02 425/78 |
| 2,800,684 | A * | 7/1957 | Luthman | B22F 3/03 425/78 |

(Continued)

*Primary Examiner* — Benjamin A Schiffman
(74) *Attorney, Agent, or Firm* — Thomas | Horstemeyer, LLP (57) ABSTRACT

Described herein are expandable foaming molds. The foaming molds described herein permit mold boundaries to expand along with the expanding polymer and thereby conform to the foaming dynamics of the polymer material. By modifying the temperature and pressure applied to the mold devices described herein, the properties of the resulting foamed polymer can be fine-tuned for specific applications.

19 Claims, 9 Drawing Sheets

(56) References Cited

U.S. PATENT DOCUMENTS

| | | | | |
|---|---|---|---|---|
| 3,078,540 | A * | 2/1963 | Bush | B28B 3/08 |
| | | | | 425/78 |
| 3,604,060 | A * | 9/1971 | Lundstrom | B29C 43/10 |
| | | | | 425/405.1 |
| 3,773,446 | A * | 11/1973 | Borrini | B01J 3/04 |
| | | | | 425/78 |
| 4,260,346 | A * | 4/1981 | Anderson, Jr. | B30B 15/161 |
| | | | | 425/352 |
| 4,352,648 | A * | 10/1982 | Hilton | B30B 15/32 |
| | | | | 425/345 |
| 4,818,201 | A * | 4/1989 | Howard | B22F 3/03 |
| | | | | 425/405.2 |
| 5,897,826 | A * | 4/1999 | Lashmore | B28B 7/44 |
| | | | | 264/437 |
| 8,211,359 | B2 * | 7/2012 | Beane | B30B 15/26 |
| | | | | 419/66 |
| 9,492,867 | B2 * | 11/2016 | Murasugi | B22F 3/03 |
| 2011/0319441 | A1 * | 12/2011 | Szymczak | B30B 15/34 |
| | | | | 514/290 |
| 2015/0050378 | A1 * | 2/2015 | Fujiwara | B29C 43/58 |
| | | | | 425/415 |
| 2017/0035656 | A1 * | 2/2017 | Luber | B30B 15/34 |

\* cited by examiner

EXPANDABLE FOAMING MOLDS AND APPLICATIONS THEREOF

CROSS REFERENCE TO RELATED APPLICATIONS

This application claims priority upon U.S. provisional application Ser. No. 62/842,965, filed May 3, 2019. This application is hereby incorporated by reference in its entirety.

BACKGROUND

The production of foamed polymers is a technologically important process for producing micro- and nanoporous materials that have many applications including thermal or sound insulation, tissue engineering scaffolds, drug delivery in biomedical applications, and other targeted applications such as the manufacture of shoe soles.

Traditionally, polymer foaming is carried out using chemical blowing agents, which decompose when heated, or low boiling solvents such as pentane. Physical blowing agents such as carbon dioxide or nitrogen or their mixtures which are gases at ambient conditions and therefore they do not leave unwanted residues in the foamed material and are considered to be environmentally safe and benign.

Foaming with carbon dioxide or nitrogen can be achieved by different procedures. In one process, the polymer is exposed to the gas under pressure at ambient temperatures to allow carbon dioxide to diffuse into the polymer. Then, the pressure is reduced, the sample is taken out of vessel and heated to a temperature close to the softening temperature of the polymer upon which $CO_2$ expands and leads to the formation of foamed polymer. This is referred to solid-state foaming, which is a batch-wise operation. In other modes of operations, polymer is exposed to carbon dioxide under pressure at a temperature (which is selected depending on the amorphous or crystalline nature of the polymer) close to softening or melting temperature to allow diffusion and dissolution of carbon dioxide in the polymer. Then the pressure in the chamber is rapidly reduced which initiates bubble nucleation and growth leading to formation of foamed polymer materials.

These type of operations can be carried out under free-foaming or confined-foaming configurations. In the free-foaming mode, polymer is not restricted and can undergo expansion in any direction. In the confined-foaming mode, the sample is confined in a mold. The boundaries of the mold may not allow the polymer to expand fully in all directions to its full potential. The foam produced however may assume the shape of the mold, which may be desirable. In industrial practice, extrusion foaming operates in the free-foaming mode. Carbon dioxide is introduced to the polymer being extruded at its later stage before exiting from the die. As the polymer plus carbon dioxide exits the die, expanding carbon dioxide leads to foaming of the polymer. In contrast, the injection molding foaming operates under confinement in which polymer plus carbon dioxide is injected into a mold cavity and allowed to expand to fill the space defined by the mold.

SUMMARY

Described herein are expandable foaming molds. The foaming molds described herein permit mold boundaries to expand along with the expanding polymer and thereby conform to the foaming dynamics of the polymer material. By modifying the temperature and pressure applied to the mold devices described herein, the properties of the resulting foamed polymer can be fine-tuned for specific applications.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an example, a numerical range of "about 1" to "about 5" should be interpreted to include not only the explicitly recited values of about 1 to about 5, but also to include individual values and sub-ranges within the indicated range. Thus, included in this numerical range are individual values such as 2, 3, and 4, the sub-ranges such as from 1-3, from 2-4, from 3-5, from about 1-about 3, from 1 to about 3, from about 1 to 3, etc., as well as 1, 2, 3, 4, and 5, individually. The same principle applies to ranges reciting only one numerical value as a minimum or maximum. The ranges should be interpreted as including endpoints (e.g., when a range of "from about 1 to 3" is recited, the range includes both of the endpoints 1 and 3 as well as the values in between). Furthermore, such an interpretation should apply regardless of the breadth or range of the characters being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if a polymer is disclosed and discussed, and a number of different melting temperatures are discussed, each and every combination of polymer and melting temperature that is possible is specifically contemplated unless specifically indicated to the contrary. For example, if a class of polymers A, B, and C are disclosed, as well as different melting temperatures D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination of A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such composition is specifically contemplated and should be considered disclosed.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "a spring" includes two or more springs and the like.

"Optional" or "optionally" means that the subsequently described event or circumstance can or cannot occur, and that the description includes instances where the event or circumstance occurs and instances where it does not.

Throughout this specification, unless the context dictates otherwise, the word "comprise," or variations such as "comprises" or "comprising," will be understood to imply the inclusion of a stated element, integer, step, or group of elements, integers, or steps, but not the exclusion of any other element, integer, step, or group of elements, integers, or steps.

As used herein, the term "about" is used to provide flexibility to a numerical range endpoint by providing that a given numerical value may be "a little above" or "a little below" the endpoint without affecting the desired result. For purposes of the present disclosure, "about" refers to a range extending from 10% below the numerical value to 10% above the numerical value. For example, if the numerical value is 10, "about 10" means between 9 and 11 inclusive of the endpoints 9 and 11.

As used herein, the term "polymer" may refer to a homo-polymer, a copolymer, a tri-polymer and other multi-polymer, or a mixture thereof, or polymers that may incorporate additives such as nucleating agents, fillers, fibers, drug molecules, or other substances that may improve foaming or improve foam properties for targeted applications.

As used herein, "instruction(s)" means documents describing relevant materials or methodologies pertaining to a kit. These materials may include any combination of the following: background information, list of components and their availability information (purchase information, etc.), brief or detailed protocols for assembling the mold devices described herein, procedures for using the mold devices to produce foamed polymers, trouble-shooting, references, technical support, and any other related documents. Instructions can be supplied with the kit or as a separate member component, either as a paper form or an electronic form which may be supplied on computer readable memory device or downloaded from an internet website, or as recorded presentation. Instructions can include one or multiple documents and are meant to include future updates.

Expandable Foaming Molds

Described herein are expandable foaming molds. The foaming molds described herein permit mold boundaries to expand along with the expanding polymer and thereby conform to the foaming dynamics of the polymer material. The molds described herein are designed to expand and compress due to pressure changes within the mold.

Figures 1, 2:
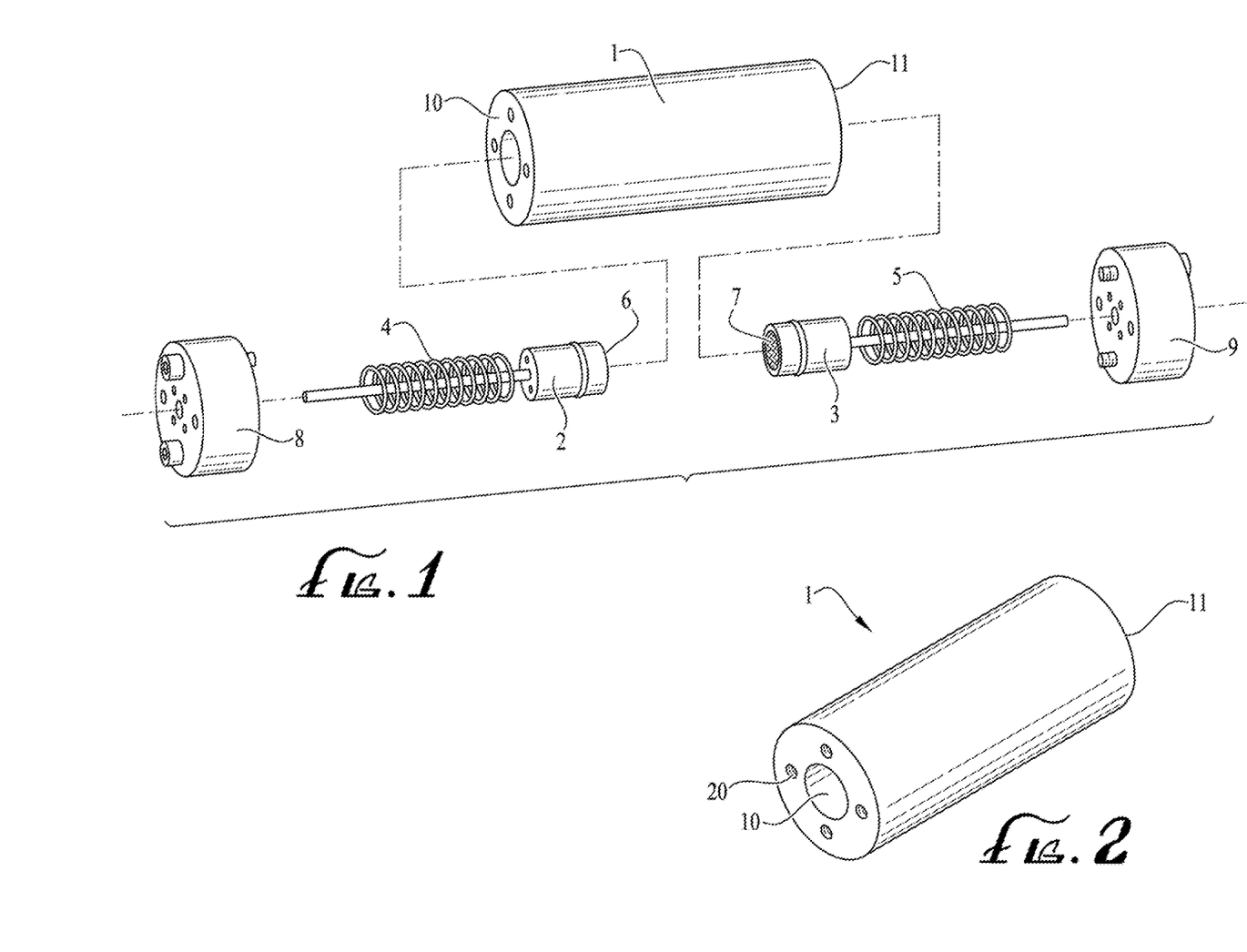
FIG. 1 shows the components of an expandable mold described herein.
FIG. 2 shows an exemplary housing used in an expandable mold described herein.

In one aspect, the molds described herein involve the use of pistons positioned in a housing. This feature is depicted in FIG. 1. FIG. 1 provides the individual components for producing an expandable mold described herein.

Referring to FIG. 1, the housing 1, a first piston 2, a second piston 3, a first spring 4, a second spring 5, a first porous plate 6 integrated in the face of piston 2, a second porous plate 7 integrated in the face of piston 2, a first end cap 8, and a second end cap 9 are provided. Each component is described in detail below.

The housing 1 is hollow and has a first end 10 with an opening for receiving the first piston 2, a second end 11 with an opening for receiving the second piston 3. The housing 1 is a cylinder as a preferred geometry, however, the housing can take on other shapes. The dimensions such as the length and diameter of the housing 1 can vary depending upon the foam polymer to be produced and application thereof. Additionally, the interior dimensions of the housing can vary depending upon the shape and dimensions of the final foamed polymer product. For example, the interior dimensions of the housing can be a geometrical shape such as, for example, a circle, square, triangle, and the like. In other aspects, the interior dimensions of the housing can be an asymmetrical shape. The housing 1 can be composed of any materials that can withstand changes in temperature and pressure. In one aspect, the housing 1 is composed of aluminum, stainless steel, titanium, or any combination thereof.

In one aspect, the interior surface of the housing 1 can be coated with a material that will facilitate removal of the foamed polymer after production. In one aspect, the interior surface of the housing 1 can be coated with polytetrafluoroethylene (TEFLON®).

In one aspect, the housing 1 includes one or more screw holes at the first end and second end of the housing for receiving the first end cap and second end cap. This feature is depicted in FIG. 2, where screw holes 20 are at the first end 10 of the housing 1. The number of screw holes can vary depending upon the size of the housing 1. Similarly, screw holes can also be present at the second end 11 of the housing 1. In this aspect, the screw holes are present in order to secure the first and second end caps 8 and 9, respectively, to the housing 1.

Figure 3A:
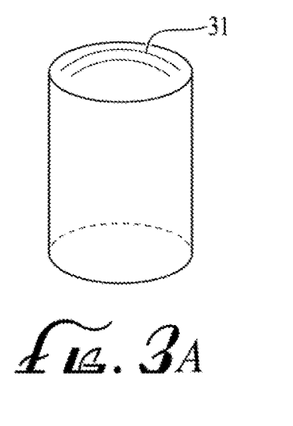
FIGS. 3A and 3B show exemplary housings used in an expandable mold described herein.
Figure 3B:
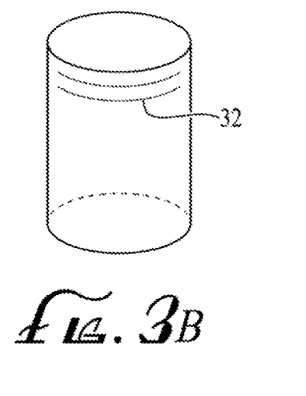

In another aspect, the first end 10 and second end 11 of the housing 1 is threaded for receiving the first end cap 8 and the second end cap 9. In one aspect, the interior of the first and second of the housing 1 is threaded (31) in order to receive the first and second end cap (FIG. 3A). In another aspect, the exterior of the first and second of the cylindrical housing 1 is threaded (32) in order to receive the first and second end cap (FIG. 3B).

Figure 4A:
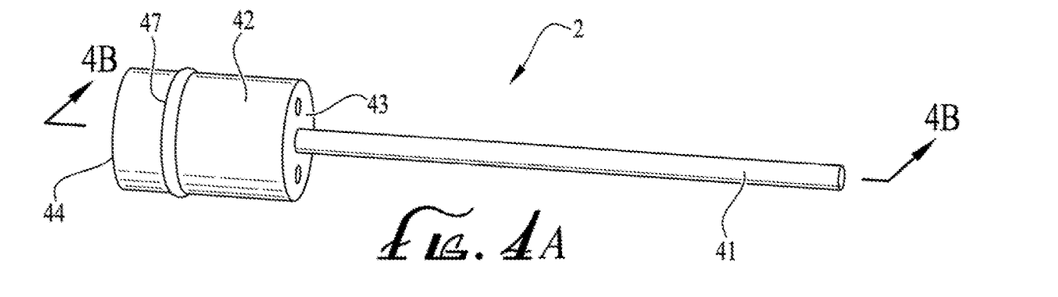
FIGS. 4A and 4B show exemplary pistons used in an expandable mold described herein.
Figure 4B:
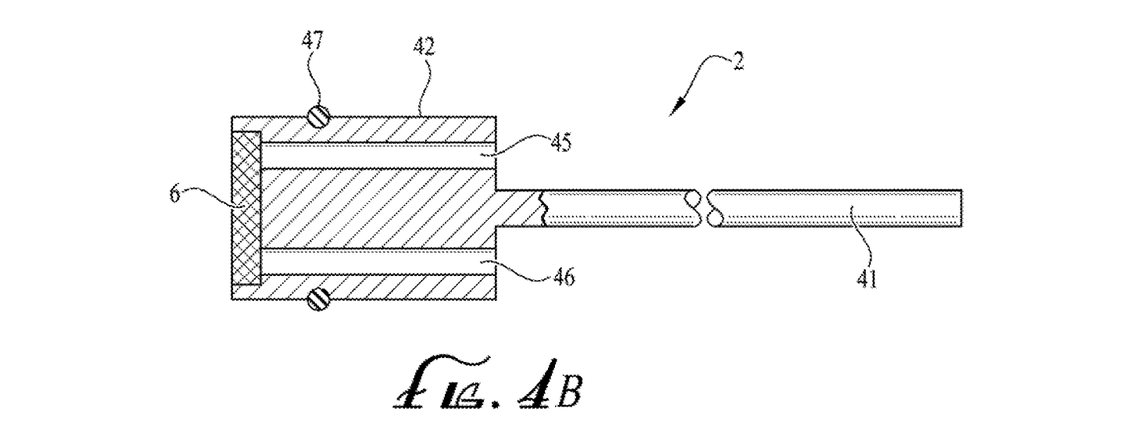

FIGS. 4A-4B depict the first piston 2. The first piston 2 includes a first piston rod 41 and a first piston body 42 comprising a first piston face 43 and a second piston face 44, wherein the first piston rod 41 is connected to the first face 43 of the first piston body 42. The first piston rod 41 can be connected to the first piston body 42 in a number of different ways such as, for example, screwed into the first body, welded to the first body, or machined as an integral part of the first piston body.

The first piston body 42 has one or more piston holes along the entire length of the first piston body. This feature is depicted in FIG. 4B, which shows the cross-section view of the first piston body 42. Referring to FIG. 4A, piston holes 45 and 46 run the full length of the piston body 42. The number of holes and the diameter of each hole can vary.

The first piston body 42 has a shape that conforms to the interior dimensions of the housing 1 such that the first piston 2 is slidably positionable in the cylindrical housing 1. For example, if the housing 1 is milled to have interior dimensions of a square, then the shape of the first piston body 42 is also shaped as a square. The first piston body 42 will form a seal with the interior surface of the housing 1 such that no polymer leaches from mold device during use. In certain aspects, first piston 2 further includes an O-ring, wherein the O-ring is on the outer surface of the first piston body. This feature is depicted in FIG. 4A, where O-ring 47 is present on the piston body 42. The O-ring prevents the physical blowing agent from escaping in between the piston and the inner cavity. The piston with the O-ring fits snugly in the inner cavity of the housing but permits the piston to move within the housing by the force of expanding polymer during foaming.

The piston body and rod can be composed of any materials that can withstand changes in temperature and pressure. In one aspect, the piston body and rod can be composed of aluminum, stainless steel, titanium, brass, polyetheretherketone (PEEK), or any combination thereof.

In one aspect, the first and second piston are the same. Thus, the description above with respect to the first piston 2 is also applicable to the second piston 3.

Springs 4 and 5 may be selected from a range of springs with respect to their spring constants which will be, to a large extent, dependent also on the type of polymer to be foamed. They should exert sufficient tension to promote the conformity of the polymer to the confining volume when polymer is softened, and yet be able to be compressed during the expansion of the polymer. As depicted in FIG. 1, the springs 4 and 5 can be slidably positionable around the piston rods.

The mold device as depicted in FIG. 1 and FIG. 4B includes porous plates 6 and 7 that are integral to the second surfaces (i.e., face) of the pistons. In one aspect, the first porous plate 6 has dimensions that conform and fit into the second face 44 of the first piston body 42 as depicted in FIG. 4B. The second face of the piston body can be flat or contoured depending upon the foamed product to be produced. In another aspect, the porous plate 6 can be easily positioned and fitted on the second face 44 of the first piston body 42. In one aspect, the porous plate can be brazed to the second face 44 of the piston body. In one aspect, the second face of the first and second piston are flat. In another aspect, the second face of the first and second piston are contoured, where the contours can be the same or different.

In one aspect, the first porous plate and the second porous plate are the same material. In another aspect, the first porous plate and the second porous plate are different materials or have different porosities. In one aspect, the porous plates 6 and 7 may independently be a sintered metal plate, a wire mesh plate, a laser drilled metal plate, or a polymeric plate such as, for example, PEEK. Average pore sizes can be in the range from about 1 μm to about 100 μm, or about 1 μm, about 5 μm, about 10 μm, about 20 μm, about 30 μm, about 40 μm, about 50 μm, about 60 μm, about 70 μm, about 80 μm, about 90 μm, or about 100 μm, where any value can be a lower and upper endpoint of a range (e.g., about 40 μm to about 60 μm) as determined with the use of a scanning electron microscope (SEM). The proper pore size and configuration for the porous plates may be selected depending upon the polymer to be foamed. Pore size and the configuration should allow for easy passage of physical blowing agent (e.g., carbon dioxide or nitrogen) but without polymer being extruded into the pores causing the pores being clogged during foaming of the polymer. The thickness of the porous plate may be varied, but typically in the range from about 0.5 mm to about 3 mm, or about 0.5 mm, about 1.0 mm, about 1.5 mm, about 2.0 mm, about 2.5 mm, or about 3.0 mm, where any value can be a lower and upper endpoint of a range (e.g., about 1.0 mm to about 2.5 mm). In one aspect, the first and second porous plates 6 and 7 are the same plates with same dimensions (diameter and thickness).

Figure 5A:
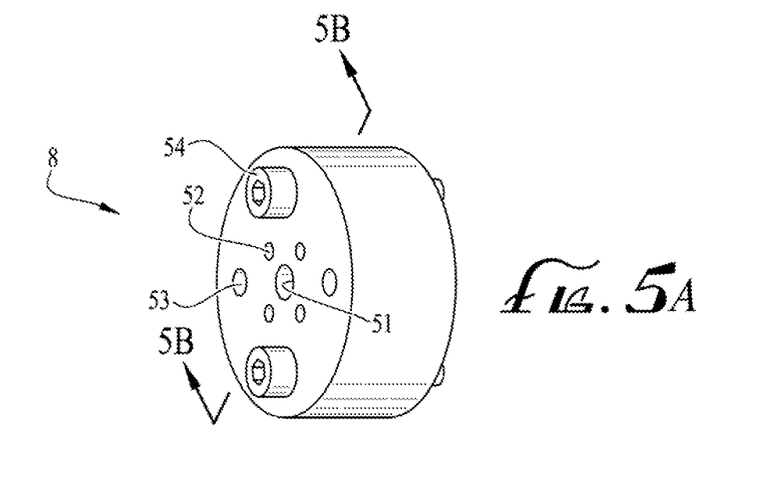
FIGS. 5A and 5B show exemplary end caps used in an expandable mold described herein.
Figure 5B:
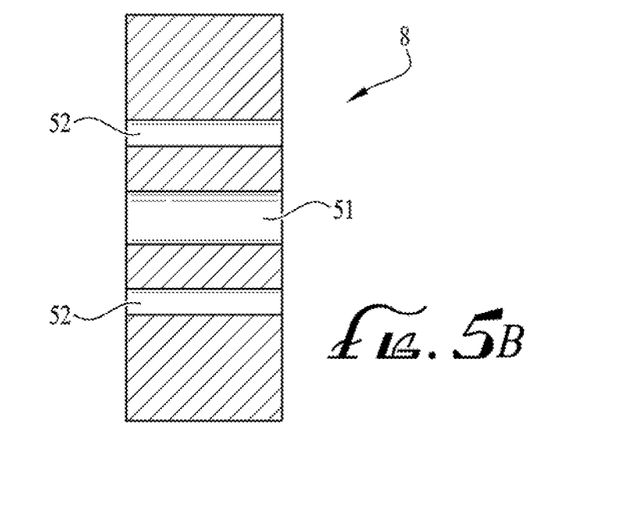

Referring to FIG. 1, the mold device includes end caps 8 and 9. In one aspect, the end caps 8 and 9 have the same design features. FIGS. 5A-5B depict an exemplary end cap. The end cap 8 has a hole 51 positioned in the center of the end cap for receiving the first piston rod 41. The end cap also has one or more holes 52 along the entire length of the first end cap. The number of holes and the diameter of each hole can vary. In case foaming is conducted without placing the complete mold assembly into a high pressure foaming chamber to expose to the foaming agent, the end caps can be modified to allow for entrance and escape of the physical blowing agent from directly, and in such a case, the end caps will not have holes, but only a high-pressure tubing connections as described below.

The end caps 8 and 9 are configured to be secured to the first end of the housing 1. In one aspect, the first end cap 8 and second end cap 9 includes one or more screw holes 53 and screws 54 for securing the first end cap and second end cap to the first end and second end of the housing. In other aspects, the first end cap 8 and second end cap 9 of the are threaded for receiving the first end and second end of the housing (FIG. 3A-3B).

In one aspect, the end caps 8 and 9 are composed of aluminum, stainless steel, titanium, or any combination thereof. In another aspect, the end caps 8 and 9 are composed of the same material and have the same dimensions.

Figures 6A, 6B:
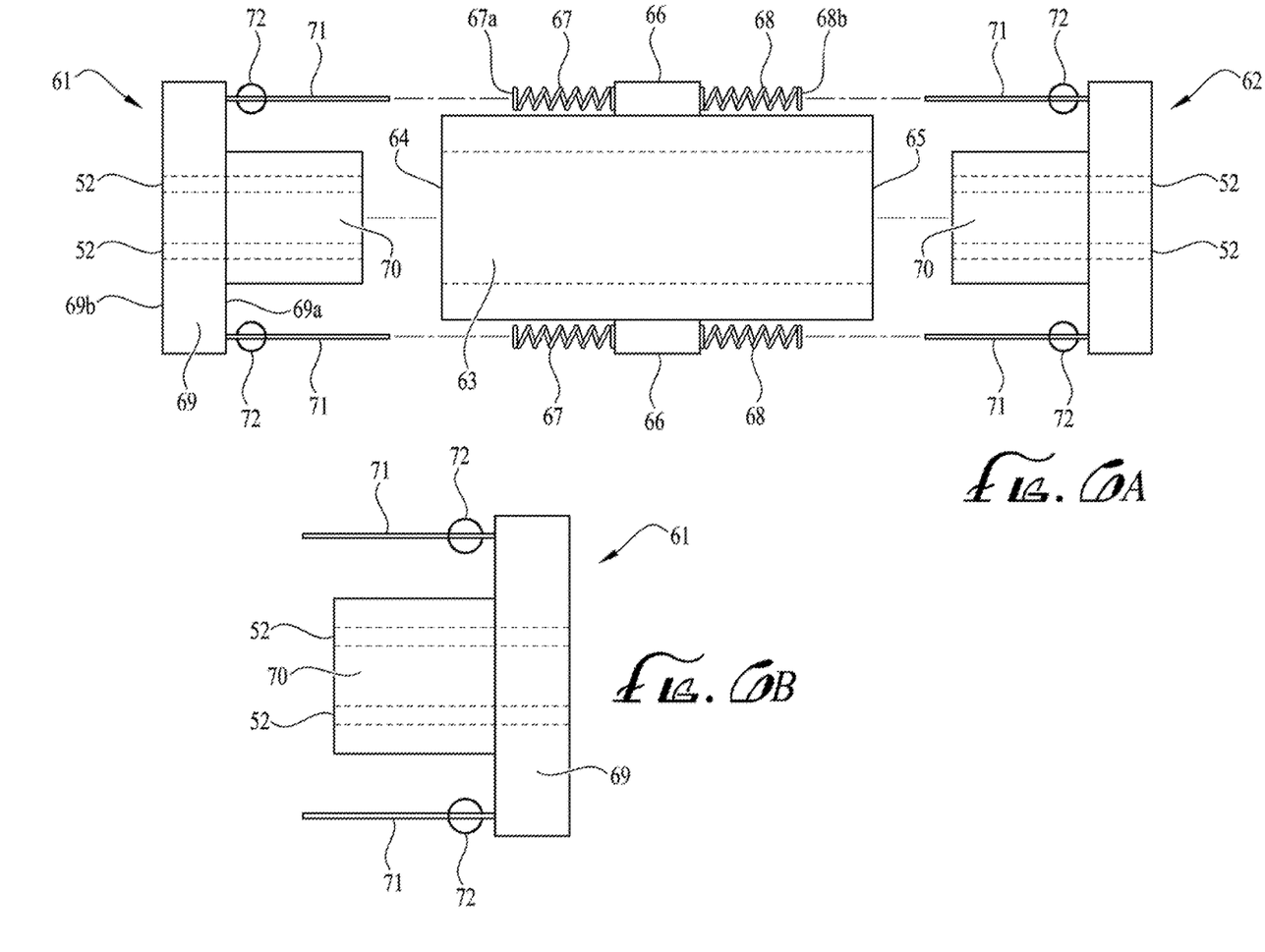
FIGS. 6A and 6B show an expandable mold described herein with two movable end caps.

In other aspects, the expandable mold devices can use one or more movable end caps. FIG. 6A depicts a mold device with two movable end caps 61 and 62 with a hollow housing 63.

The housing 63 has a first end 64 with an opening for receiving the first end cap 61, a second end 65 with an opening for receiving the second end cap 62. The housing 63 includes one or more spring holders 66 on the exterior surface of the cylindrical housing 63. Springs 67 and 68 are attached and secured to the holder in a manner such that each spring is aligned parallel to the housing 63. In one aspect, the springs 67 and 68 can be welded or soldered to the spring holder 66.

The dimensions such as the length and diameter of the housing 63 can vary depending upon the foam polymer to be produced and application thereof. Additionally, the interior dimensions of the housing can be any desirable shape. The housing 63 can be composed of any materials that can withstand changes in temperature and pressure. In one aspect, the housing 63 is composed of aluminum, stainless steel, titanium, brass, polyetheretherketone (PEEK), or any combination thereof.

In one aspect, the interior surface of the housing 63 can be coated with a material that will facilitate removal of the foamed polymer after production. In one aspect, the interior surface of the housing 63 can be coated with polytetrafluoroethylene (TEFLON®).

The end caps 61 and 62 include (i) a body 69 having a first face 69a and a second face 69b, (ii) a plug 70 attached to the first face 69a of body 69, wherein each plug 70 has a diameter that is the same as the interior diameter of the housing 63. In one aspect, the plug 70 may be machined as part of the end cap 61 and 62. The end caps 61 and 62 also include one or more guiding pins 71 attached to the first face 69a of the body 69, wherein each guiding pin 71 is slidably positionable in springs 67 and 68 on the housing 63. The end caps 61 and 62 have one or more holes 52 along the entire length of the first body 69 and first plug 70 (FIG. 6B). The number of holes and the diameter of each hole can vary. In one aspect, end caps 61 and 62 are the same end caps with respect to their design.

The body 69 of end cap 61 can be composed of any materials that can withstand changes in temperature and pressure. In one aspect, the body 69 is composed of aluminum, stainless steel, titanium, polyetheretherketone (PEEK), or brass, or any combination thereof. The body 69 and the plug 70 of each end cap may be made of the same material or different material. In one aspect, the plug 70 of each end cap is polytetrafluoroethylene (TEFLON®), polyetheretherketone (PEEK), stainless steel, aluminum, or brass.

The first and second plugs have dimensions that conform to the interior dimensions of the hollow housing and is slidably positionable in the housing For example, if the housing 63 is milled to have interior dimensions of a square, then the first and second plugs 70 also shaped as a square. The first and second plugs will form a seal with the interior surface of the housing such that no polymer leaches from mold device during use.

In one aspect, the face of the first and second plugs are flat. In another aspect, the face of the first and second plugs are contoured, where the contours can be the same or different.

The length of each plug 70 can vary depending upon the length of the cylindrical housing 63 and the amount of polymer that is introduced into the mold. The length of each plug 70 is sufficient so that when physical blowing agent is introduced to the mold and the mold is heated, the end caps 61 and 62 under the pulling force of the springs 67 and 68, the loose ends of which shown in FIG. 6A that are attached to the end caps during operation of the mold, will compress and move further within the cylindrical housing 63 at a desired point as determined by parameters such as, for example, the amount of pressure applied and temperature. Additionally, the length of the guiding pins 71 and springs 67 and 68 can also vary. Thus, by varying the length of the plug, guiding pins, springs, and the housing, it is possible to produce foams with various lengths.

In certain aspects, the springs can be secured to the movable end caps. In one aspect, a hole can be machined on the outer rim of the end cap to which the loose end of the of the spring can be inserted. In another aspect, the guiding pin have a small hook 72 toward the base of the guiding pin 71 (FIG. 6A) can be used to secure the spring. Once the polymer has been introduced into the housing, the movable end caps are inserted into the housing 63 via plugs 70. The guiding pins 71 are concurrently inserted into springs 67 and 68 via spring openings 67a and 68a. The end of the springs are then fastened to hook 72. In one aspect, the guiding pin with hook is machined such that the guiding pin can rotate and, thus, the hook can rotate over one or more loops of the spring in order to secure the spring to the movable end cap.

Figure 7:
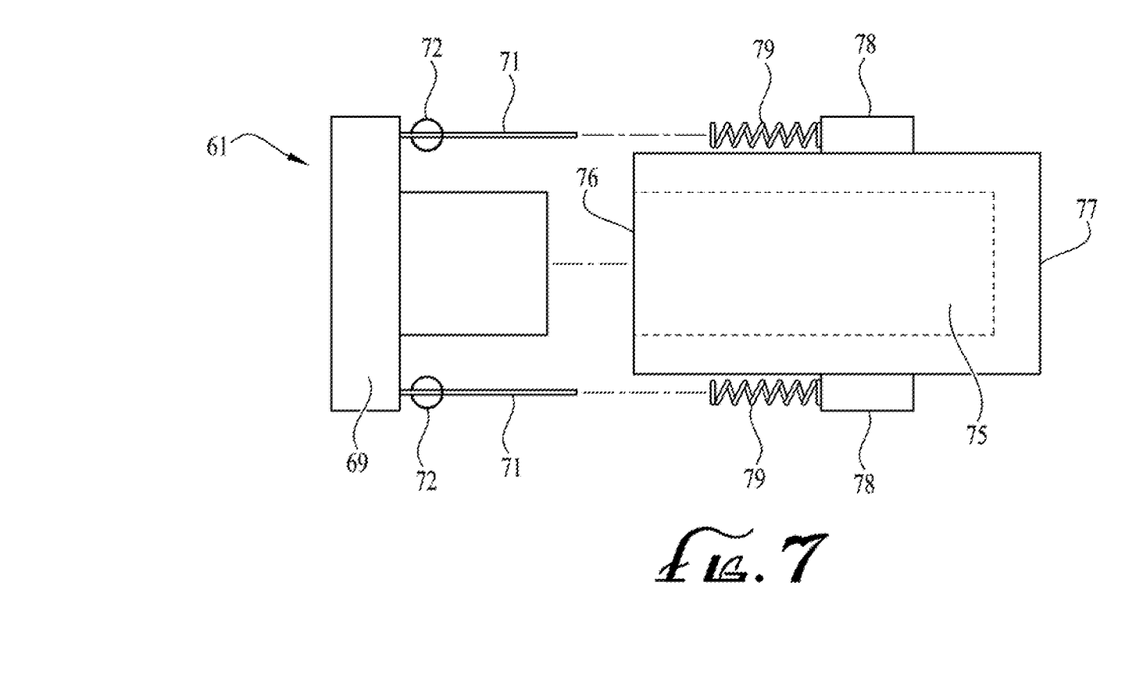
FIG. 7 shows an expandable mold described herein with one movable end cap.

FIG. 7 shows another aspect, where a single movable end cap is used. This aspect is similar to that of the expandable mold as depicted in FIG. 6 with the exception that there is a single opening in the cylindrical housing and one moveable end cap. Referring to FIG. 7, the housing 75 has a first end with an opening 76 for receiving a first end cap 61 and a second closed end 77. The housing 75 includes one or more spring holders 78 on the exterior surface of the housing 75. Springs 79 are attached and secured to the holder in a manner such that each spring is aligned parallel to the housing 75. In certain aspects, the springs can be secured to the movable end cap as described above.

Methods for Preparing Polymer Foams

The expandable molds described herein are used to produce polymer foams. In general, a polymer is introduced into the expandable mold in between the movable pistons (81 in FIG. 8) and the mold is assembled as shown in FIG. 9. Next, the assembled mold 101 is placed inside a pressure chamber 100 (FIG. 10) that can be heated and charged with a physical blowing agent such as, for example, carbon dioxide. The chamber can also be equipped with a heating element to heat the expandable mold in the chamber as well as valves 102 and 103 for introducing and removing blowing agent from the chamber. In one aspect, the pressure chamber has bolted end caps with washers placed on the inner face that ensure a leak-free seal when the chamber is closed in order to withstand high internal chamber pressures. In one aspect, the pressure chamber is operable and leak-free at pressure up to about 500 bar.

Figure 10:
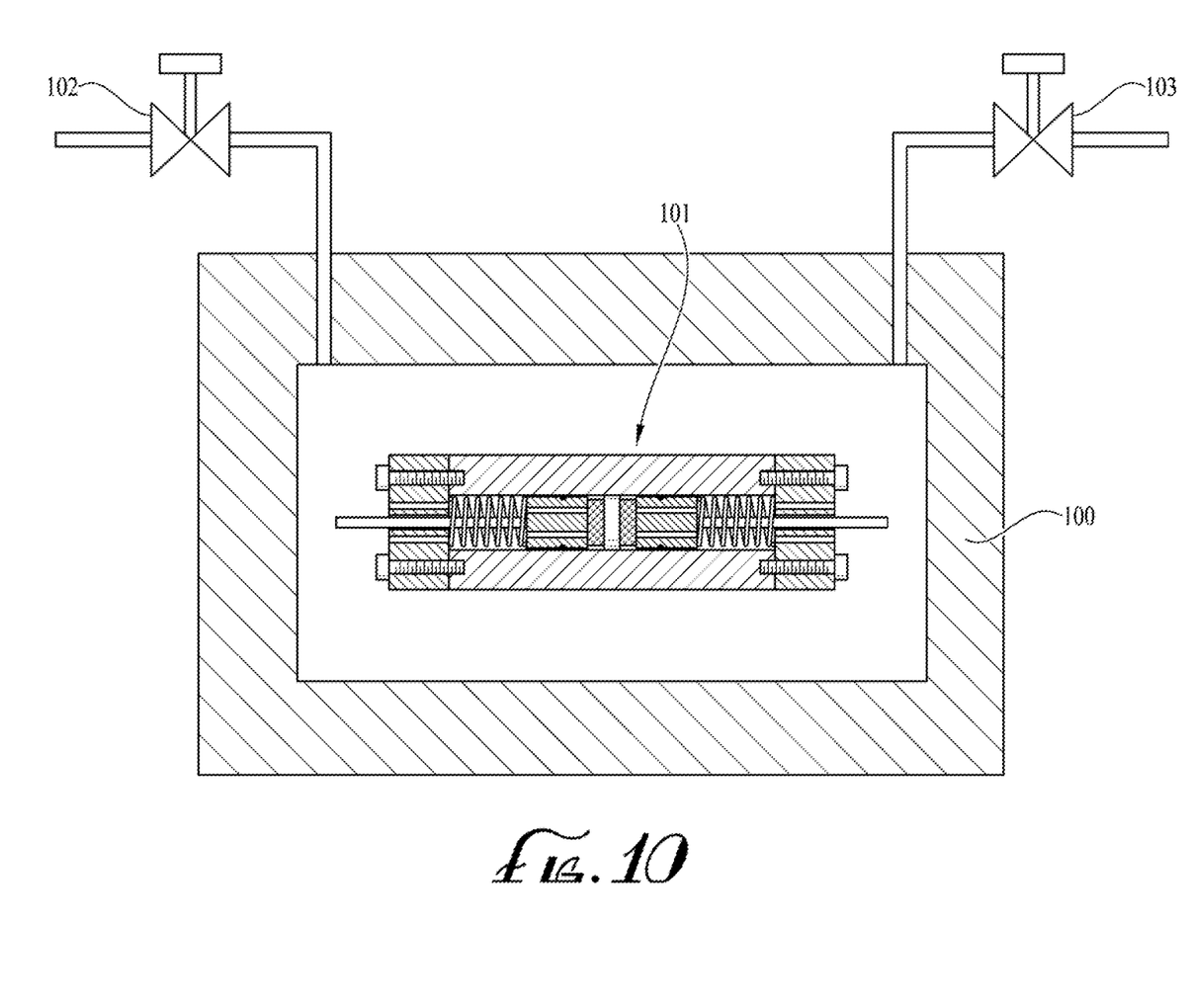
FIG. 10 shows an expandable mold described herein with polymer positioned in the mold in a pressure chamber.

The expandable mold 101 is heated at temperature and time within the foaming chamber 100 to soften or melt the polymer. The interior of the chamber 100 and expandable mold 101 is then exposed to a physical blowing agent such as, for example, carbon dioxide or nitrogen. The physical blowing agent flows through end caps of the expandable mold 101 and through the holes and the porous plates of the pistons and diffuses into the polymer. With diffusion and sorption of the physical blowing agent under at the temperature and pressure of operation, the polymer softens and conforms to the shape of the housing cavity, which is promoted by the tension applied by the pistons or movable end caps with the springs. After allowing sufficient time for physical blowing agent diffusion and sorption in the polymer at a selected temperature and pressure, the pressure is released. Along with the pressure reduction, the physical blowing agent dissolved in the polymer nucleates. The bubble nucleation leads to bubble growth along with it the expansion of the polymer. As the polymer expands, the force of expansion pushes the pistons or movable end caps back, while maintaining the shape as the expansion under the gentle back tension of the springs, until the polymer achieves its full expansion. The end result is a foamed polymer sample in the shape of the confining geometry.

The temperature of the process can vary because polymers differ with respect to their thermal transitions and capacity to dissolve the physical blowing agent, as well as the rates of diffusion of the physical blowing agent in and out of the polymer matrix as pressure or temperature are altered. Depending upon the polymer, the mold can be operated over a temperature typically from around room temperature to around 200° C., and pressures from about atmospheric to about 500 bar. Subambient temperatures may also be accessible if the foaming chamber is equipped with cooling elements.

The pressure of the physical blowing agent can also vary. In one aspect, the pressure of the physical blowing agent is from about 10 bar to about 500 bar, or about 10 bar, about 50 bar, about 100 bar, about 150 bar, about 200 bar, about 250 bar, about 300 bar, about 350 bar, about 400 bar, about 450 bar, or about 500 bar, where any value can be a lower and upper endpoint of a range (e.g., about 150 bar to about 250 bar, etc.).

Depending upon the application of the foamed polymer, a number of different polymers can be used in the expandable molds described herein. The polymers can be homopolymers, or copolymers, or their blends. In one aspect, the polymers can be homopolymers of acrylates, methacrylates, acrylamides, or methacrylamides. In other aspects, polymers may be polymers of styrene, or biodegradable polymers, like poly(lactic acid) or polycaprolactone. In other aspects, the polymer can be a copolymer of ethylene or propylene with one or more other monomers such as vinyl monomers (e.g., vinyl acetate), styrene, acrylates, methacrylates, acrylamides, or methacrylamides. The copolymers can be random or block copolymers. When introduced into the expandable mold, the polymer is in a solid form such as, for example, pellets or a wafer.

Figure 8:
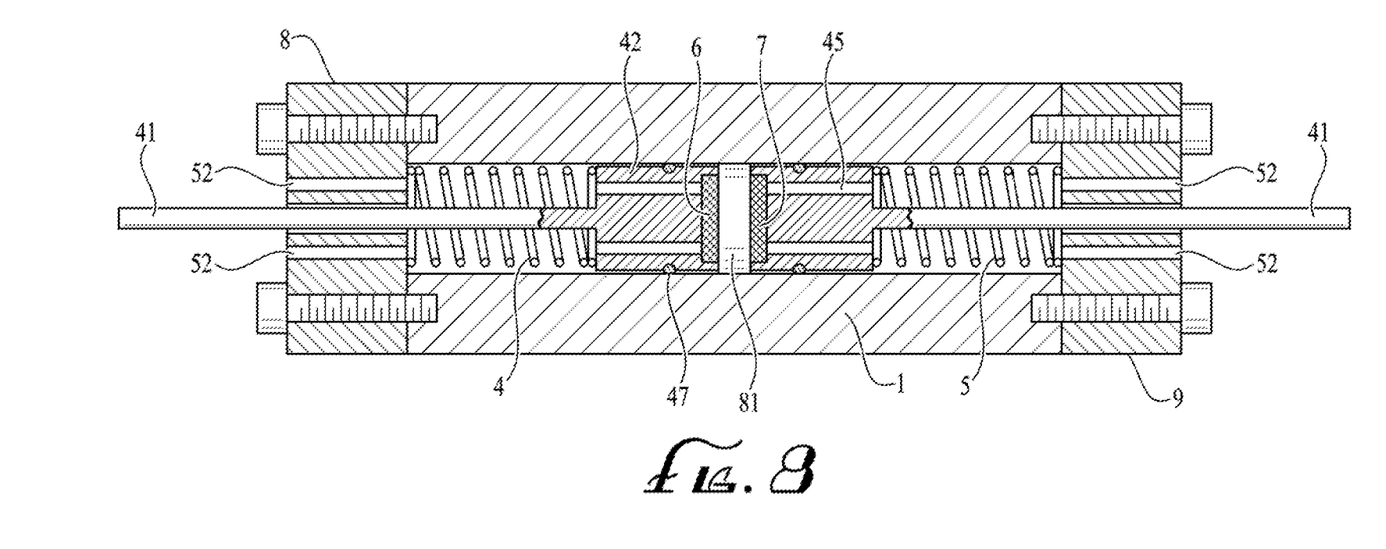
FIG. 8 shows an expandable mold described herein with polymer positioned in the mold.
Figure 9:
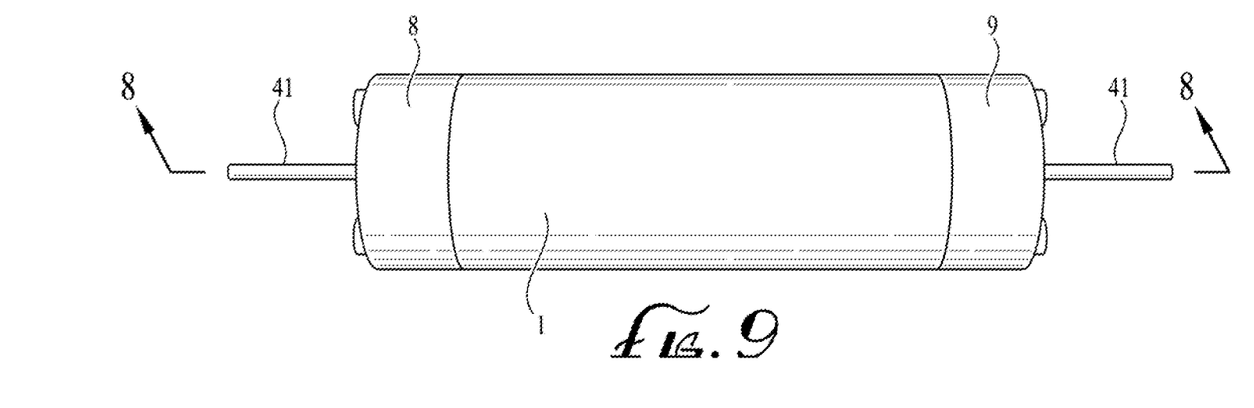
FIG. 9 shows an assembled expandable mold described herein.

FIG. 8 shows the cross-sectional view of an expandable mold with polymer in the mold. The polymer 81 to be foamed is placed in-between the first and second pistons 2 and 3 pistons in the cylindrical housing 1. When the end caps 8 and 9 are attached, the springs 4 and 5 hold the polymer under tension in the cylindrical housing 1. FIG. 9 shows the expandable mold where the end caps 8 and 9 are attached to the cylindrical housing 1.

Referring to FIG. 8, when the expandable mold is exposed to physical blowing agent, the physical blowing agent flows through the holes 52 of the end caps 8 and 9, through the piston holes 45, through the porous plates 6 and 7, and into the polymer 81. After the pressure of the physical blowing agent is reduced and the expandable mold is cooled, the expandable mold is opened and the foamed polymer is removed, where foamed polymer retains the shape of the mold (e.g., cylinder).

Figure 11:
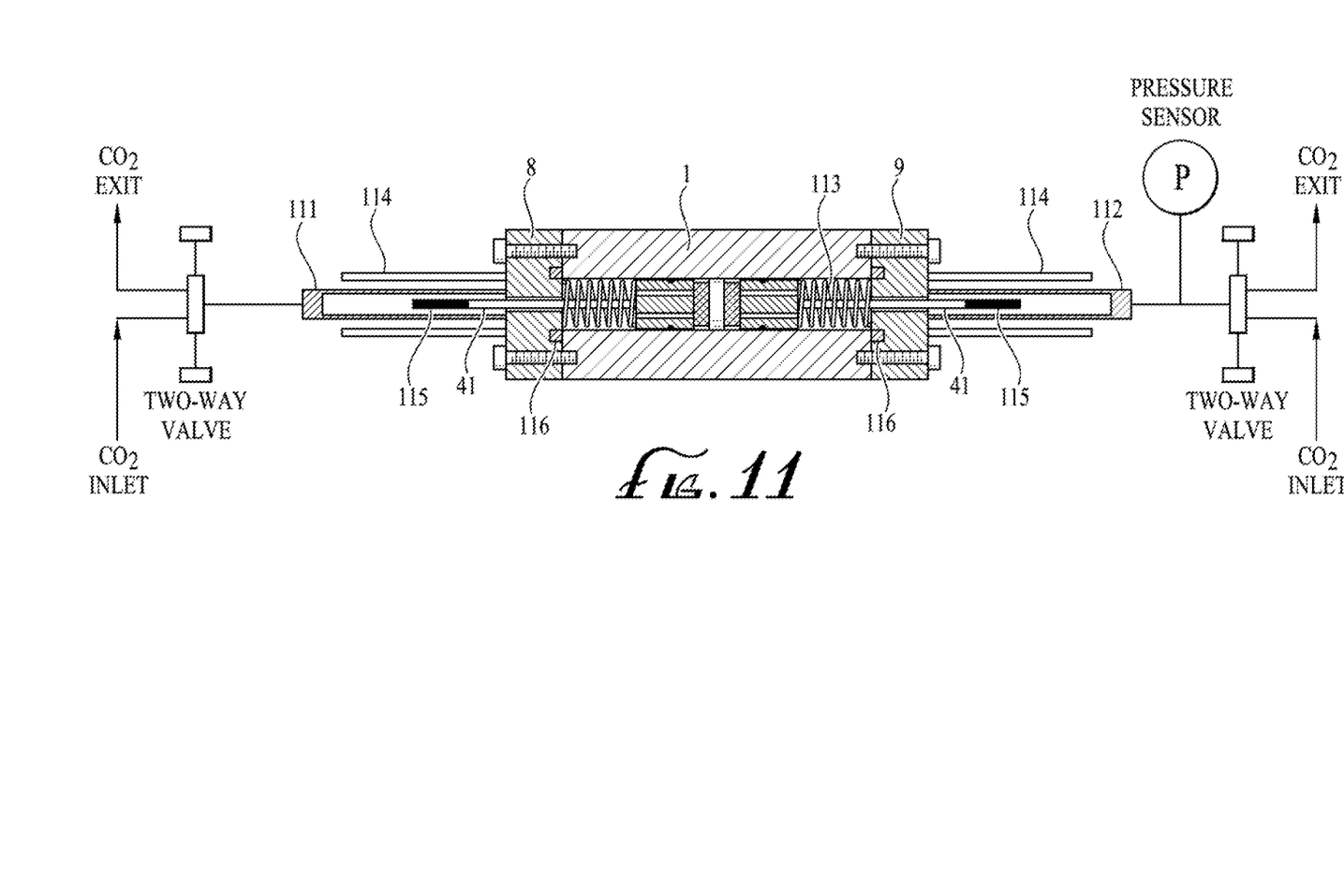
FIG. 11 shows an expandable mold described herein with sensors and pressurized gas lines.

In another aspect, physical blowing agent lines are directly used for introducing and removing blowing agent from the expandable mold. For this mode of operation, referring to FIGS. 5A and 5B, the end cap has only the central hole (51) and no other holes (52). In one aspect, in order to create a leak-free seal between the end caps 8 and 9 and the housing 1, a washer 116 such as, for example, a PEEK film, a copper foil, or an O-ring (e.g., Teflon) can be positioned between each end cap and the housing to create a leak-free seal when the end cap is bolted or screwed to the housing. The gas lines are connected to the end caps using the central hole 51. In this aspect, blowing agent can be introduced into the expandable mold at both end caps. The rate of escape of blowing agent from each end of the expandable mold through the end cap during depressurization can be the same or different depending upon the length or size of the of tubing used, or the settings of the valves. FIG. 11 depicts physical blowing agent lines 111 and 112 attached to end caps 8 and 9. In this configuration, the mold assembly does not need to be placed in a separate pressure chamber as provided in FIG. 10. The expandable mold body 110 can be heated with tape heaters or cartridge heaters in order to melt the polymer within the mold.

In certain aspects, one or more sensors can be incorporated or used in conjunction with the expandable molds described herein. In one aspect, temperature and/or pressure sensors can be incorporated within the expandable mold. For example, referring to FIG. 11 a temperature and/or pressure sensor can be attached to the interior wall of the cylindrical housing where the spring is located (i.e., the spring cavity 113).

In other aspects, position sensing elements can be incorporated or used in conjunction with the expandable molds described herein. In one aspect, position sensing elements can follow the movement of movable pistons as the foam expansion occurs. For example, this can be readily achieved using linear variable differential transformer (LVDT) sensors. Referring to FIG. 11, LVDT sensors 114 are positioned around the second housings 111 and 112 that house the piston rods 41 with a magnetic sensing core 115. As the piston moves, the sensors can monitor piston movement based on the movement of the magnetic core attached to the piston rods.

Figure 12:
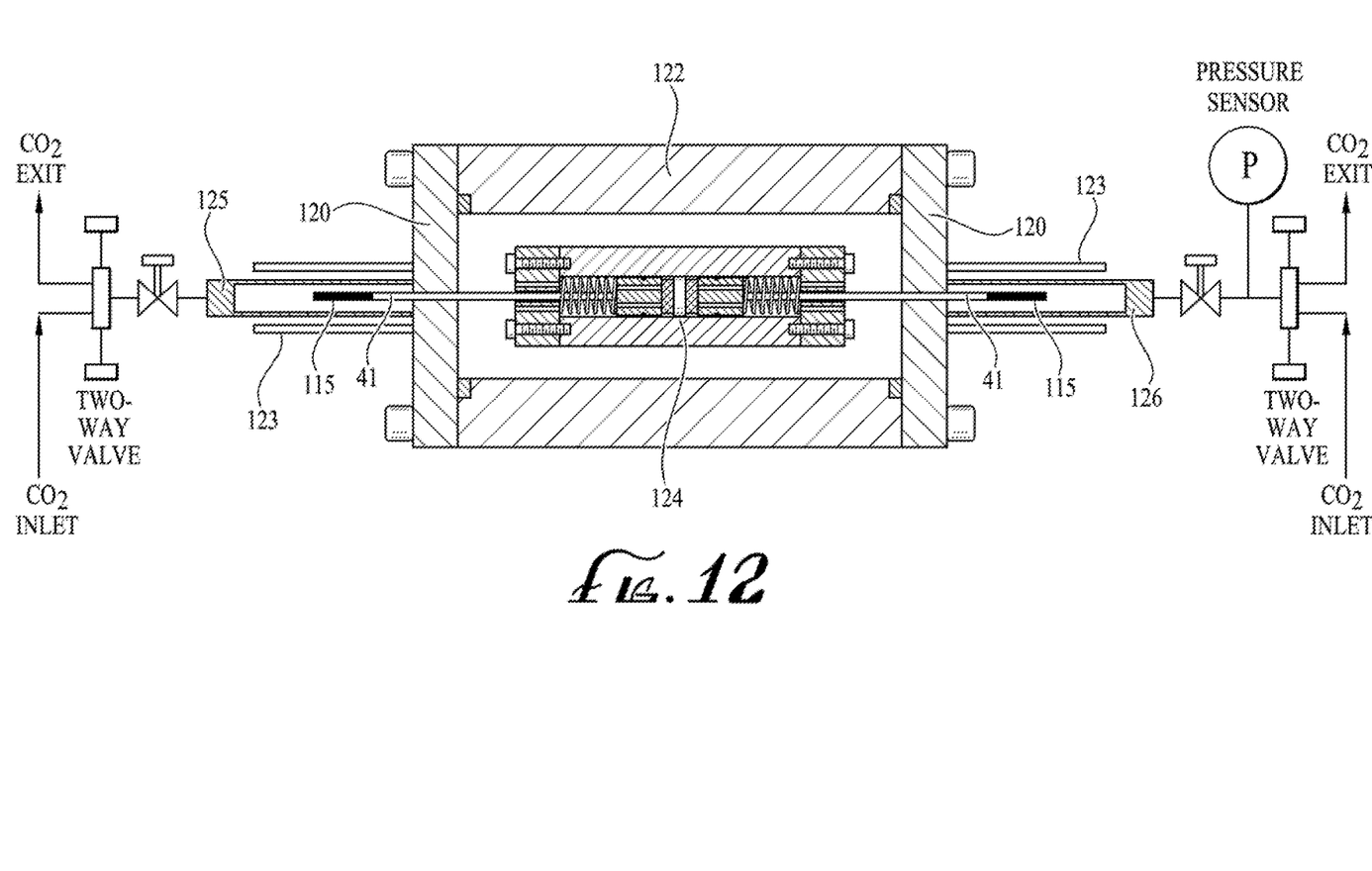
FIG. 12 shows an expandable mold described herein in a pressure chamber, where the pressure chamber, where the chamber is fitted with position sensing elements.

In another aspect, the position sensing elements can be made part of the high pressure chamber. This feature is depicted in FIG. 12, where the end-caps 120 and 121 of the chamber are modified with LVDT sensors 123 and positioned around the second housings 125 and 126 that house piston rods 41 a magnetic sensing core 115. In this aspect, the expandable mold can be placed in the chamber 122 without having to make the expandable mold end caps leak proof.

The polymer foams produced by the molds and methods described herein are three dimensional shapes. Depending upon the interior design and dimensions of the housing as well as the contours of the piston and plug faces described herein, it is possible to produce foamed articles having any desirable shape and size.

Kits

Described herein are kits that include any of the components described herein for assembling the expandable molds. For example, the kit can include the components as provided in FIG. 1. In one aspect, instructions are also provided for assembling and using the expandable mold.

Aspects

Aspect 1: A mold device comprising
(a) a hollow housing having a first end with an opening for receiving a first piston, a second end with an opening for receiving a second piston, and an interior surface;
(b) a first piston comprising a first piston rod and a first piston body comprising a first piston face and a second piston face, wherein the first piston rod is connected to the first face of the first piston body, wherein the first piston body has one or more piston holes along the entire length of the first piston body, wherein the first body has a shape that conforms to the interior dimensions of the hollow housing, and wherein the first piston is slidably positionable in the housing;
(c) a second piston comprising a second piston rod and a second piston body comprising a first piston face and a second piston face, wherein the second piston rod is connected to the first face of the second piston body, wherein the second piston body has one or more piston holes along the entire length of the second piston body, wherein the second body has dimensions that conform to the interior dimensions of the hollow housing, and wherein the first piston is slidably positionable in the housing;
(d) a first porous plate having dimensions that conform to the second face of the first piston body and integral to the second face of the first piston body;
(e) a second porous plate having dimensions that conform to the second face of the second piston body and integral to the second face of the second piston body;
(f) a first spring, wherein the first spring is slidably positionable around the first piston rod;
(g) a second spring, wherein the second spring is slidably positionable around the second piston rod;
(h) a first end cap, wherein the first end cap has a hole positioned in the center of the end cap for receiving the first piston rod and one or more holes along the entire length of the first end cap, wherein the first end cap is configured to be secured to the first end of the housing; and
(i) a second end cap, wherein the second end cap has a hole positioned in the center of the end cap for receiving the second piston rod and one or more holes along the entire length of the second end cap, wherein the second end cap is configured to be secured to the second end of the housing.

Aspect 2: The mold device of aspect 1, wherein the housing comprises aluminum, stainless steel, titanium, brass, polyetheretherketone (PEEK), or any combination thereof.

Aspect 3: The mold device of aspects 1 or 2, wherein the interior surface of the housing comprises a coating of polytetrafluoroethylene.

Aspect 4: The mold device in any one of aspects 1 to 3, wherein the housing comprises one or more screw holes at the first end and second end of the housing for receiving the first end cap and second end cap.

Aspect 5: The mold device in any one of aspects 1 to 4, wherein the first piston and second piston further comprises an O-ring, wherein the O-ring is on the outer surface of the first piston body and second piston body.

Aspect 6: The mold device in any one of aspects 1 to 5, wherein the first porous plate and the second porous plate comprise the same material having an average pore size of from about 1 µm to about 100 µm.

Aspect 7: The mold device in any one of aspects 1 to 5, wherein the first porous plate and the second porous plate comprise different materials, different porosities, or a combination thereof.

Aspect 8: The mold device in any one of aspects 1 to 7, wherein the first end cap and second end cap comprises one or more screw holes and screws for securing the first end cap and second end cap to the first end and second end of the housing.

Aspect 9: The method in any one of aspects 1 to 8, wherein the mold device further comprises a sensor for monitoring the movement of the first piston and second piston in the housing.

Aspect 10: The method in any one of aspects 1 to 9, wherein the mold device further comprises a temperature sensor, a pressure sensor, or a combination thereof positioned in the mold device.

Aspect 11: A mold device comprising
(a) a hollow housing having a first end with an opening for receiving a first end cap, a second end with an opening for receiving a second end cap, an interior surface, and an exterior surface, wherein the exterior surface of the housing comprises one or more spring holders, wherein the spring holder comprises two springs attached to the holder, and wherein each spring is aligned parallel to the housing;
(b) a first end cap comprising (i) a first body comprising a first face and a second face, (ii) first plug attached to the first face of the first body, wherein the first plug has dimensions that conform to the interior dimensions of the hollow housing, and (iii) one or more guiding pins attached to the first face of the first body, wherein each guiding pin is slidably positionable in the spring on the housing aligned with the first end of the housing, and wherein the first end cap has one or more holes along the entire length of the first body and first plug; and
(c) a second end cap comprising (i) a second body comprising a first face and a second face, (ii) second plug attached to the first face of the second body, wherein the second plug has dimensions that conform to the interior dimensions of the hollow housing, and (iii) one or more guiding pins attached to the first face of the second body, wherein the guiding pin is slidably positionable in the spring on the housing aligned with the second end of the housing, and wherein the second end cap has one or more holes along the entire length of the second body and second plug.

Aspect 12: The mold device of aspect 11, wherein the interior surface of the housing comprises a coating of polytetrafluoroethylene.

Aspect 13: The mold device of aspects 11 or 12, wherein the first plug and second plug are made of polytetrafluoroethylene, stainless steel, aluminum, brass, or polyetheretherketone (PEEK).

Aspect 14: A mold device comprising
(a) a hollow housing having a first end with an opening for receiving a first end cap and a second closed end, an interior surface, and an exterior surface, wherein the exterior surface of the housing comprises two or more spring holders, wherein each spring holder comprises a spring attached to the holder, and wherein each spring is aligned parallel to the housing toward the first end of the housing; and
(b) a first end cap comprising (i) a first body comprising a first face and a second face, (ii) first plug attached to the first face of the first body, wherein the first plug has dimensions that conform to the interior dimensions of the hollow housing, and (iii) two or more guiding pins attached to the first face of the first body, wherein each guiding pin is slidably positionable in each spring on the housing aligned with the first end of the housing, and wherein the first end cap has one or more holes along the entire length of the first body and first plug.

Aspect 15: The mold device of aspect 14, wherein the interior surface of the housing comprises a coating of polytetrafluoroethylene.

Aspect 16: The mold device of aspects 14 or 15, wherein the first plug and second plug are made of polytetrafluoroethylene, polyetheretherketone, stainless steel, aluminum or brass.

Aspect 17: A method for producing a foamed article, the method comprising
(a) introducing a polymer into the mold device in any one of aspects 1 to 16;
(b) heating and applying pressurized gas to the mold device; and
(c) releasing the pressurized gas from the mold device.

Aspect 18: The method of aspect 17, wherein the mold device is placed in a pressure chamber.

Aspect 19: The method of aspects 17 or 18, wherein the mold device is fitted with a line for introducing and removing pressurized gas from the mold device.

Aspect 20: A foamed polymer article produced by the method in any one of aspects 17 to 19.

What is claimed:

1. A mold device comprising
(a) a hollow housing having a first end with an opening for receiving a first piston, a second end with an opening for receiving a second piston, and an interior surface;
(b) a first piston comprising a first piston rod and a first piston body comprising a first piston face and a second piston face, wherein the first piston rod is connected to the first face of the first piston body, wherein the first piston body has one or more piston holes along the entire length of the first piston body, wherein the first body has a shape that conforms to the interior dimensions of the hollow housing, and wherein the first piston is slidably positionable in the housing;
(c) a second piston comprising a second piston rod and a second piston body comprising a first piston face and a second piston face, wherein the second piston rod is connected to the first face of the second piston body, wherein the second piston body has one or more piston holes along the entire length of the second piston body, wherein the second body has dimensions that conform to the interior dimensions of the hollow housing, and wherein the second piston is slidably positionable in the housing;
(d) a first porous plate having dimensions that conform to the second face of the first piston body and integral to the second face of the first piston body;
(e) a second porous plate having dimensions that conform to the second face of the second piston body and integral to the second face of the second piston body;
(f) a first spring, wherein the first spring is slidably positionable around the first piston rod;

(g) a second spring, wherein the second spring is slidably positionable around the second piston rod;

(h) a first end cap, wherein the first end cap has a hole positioned in the center of the end cap for receiving the first piston rod and one or more holes along the entire length of the first end cap, wherein the first end cap is configured to be secured to the first end of the housing; and (i) a second end cap, wherein the second end cap has a hole positioned in the center of the end cap for receiving the second piston rod and one or more holes along the entire length of the second end cap, wherein the second end cap is configured to be secured to the second end of the housing.

2. The mold device of claim 1, wherein the housing comprises aluminum, stainless steel, titanium, brass, polyetheretherketone (PEEK), or any combination thereof.

3. The mold device of claim 1, wherein the interior surface of the housing comprises a coating of polytetrafluoroethylene.

4. The mold device of claim 1, wherein the housing comprises one or more screw holes at the first end and second end of the housing for receiving the first end cap and second end cap.

5. The mold device of claim 1, wherein the first piston and second piston further comprises an O-ring, wherein the O-ring is on the outer surface of the first piston body and second piston body.

6. The mold device of claim 1, wherein the first porous plate and the second porous plate comprise the same material having an average pore size of from about 1 μm to about 100 μm.

7. The mold device of claim 1, wherein the first porous plate and the second porous plate comprise different materials, different porosities, or a combination thereof.

8. The mold device of claim 1, wherein the first end cap and second end cap comprises one or more screw holes and screws for securing the first end cap and second end cap to the first end and second end of the housing.

9. The method of claim 1, wherein the mold device further comprises a sensor for monitoring the movement of the first piston and second piston in the housing.

10. The method of claim 1, wherein the mold device further comprises a temperature sensor, a pressure sensor, or a combination thereof positioned in the mold device.

11. A method for producing a foamed article, the method comprising
(a) introducing a polymer into the mold device of claim 1;
(b) heating and applying pressurized gas to the mold device; and
(c) releasing the pressurized gas from the mold device.

12. The method of claim 11, wherein the mold device is placed in a pressure chamber.

13. The method of claim 11, wherein the mold device is fitted with a line for introducing and removing pressurized gas from the mold device.

14. A mold device comprising
(a) a hollow housing having a first end with an opening for receiving a first end cap, a second end with an opening for receiving a second end cap, an interior surface, and an exterior surface, wherein the exterior surface of the housing comprises one or more spring holders, wherein the spring holder comprises two springs attached to the holder, and wherein each spring is aligned parallel to the housing;

(b) a first end cap comprising (i) a first body comprising a first face and a second face, (ii) first plug attached to the first face of the first body, wherein the first plug has dimensions that conform to the interior dimensions of the hollow housing, and (iii) one or more guiding pins attached to the first face of the first body, wherein each guiding pin is slidably positionable in the spring on the housing aligned with the first end of the housing, and wherein the first end cap has one or more holes along the entire length of the first body and first plug in a direction parallel to the one or more guiding pins; and (c) a second end cap comprising (i) a second body comprising a first face and a second face, (ii) second plug attached to the first face of the second body, wherein the second plug has dimensions that conform to the interior dimensions of the hollow housing, and (iii) one or more guiding pins attached to the first face of the second body, wherein the guiding pin is slidably positionable in the spring on the housing aligned with the second end of the housing, and wherein the second end cap has one or more holes along the entire length of the second body and second plug in a direction parallel to the one or more guiding pins.

15. The mold device of claim 14, wherein the interior surface of the housing comprises a coating of polytetrafluoroethylene.

16. The mold device of claim 14, wherein the first plug and second plug are made of polytetrafluoroethylene, stainless steel, aluminum, brass, or polyetheretherketone (PEEK).

17. A mold device comprising
(a) a hollow housing having a first end with an opening for receiving a first end cap and a second closed end, an interior surface, and an exterior surface, wherein the exterior surface of the housing comprises two or more spring holders, wherein each spring holder comprises a spring attached to the holder, and wherein each spring is aligned parallel to the housing toward the first end of the housing; and (b) a first end cap comprising (i) a first body comprising a first face and a second face, (ii) first plug attached to the first face of the first body, wherein the first plug has dimensions that conform to the interior dimensions of the hollow housing, and (iii) two or more guiding pins attached to the first face of the first body, wherein each guiding pin is slidably positionable in each spring on the housing aligned with the first end of the housing, and wherein the first end cap has one or more holes along the entire length of the first body and first plug in a direction parallel to the one or more guiding pins.

18. The mold device of claim 17, wherein the interior surface of the housing comprises a coating of polytetrafluoroethylene.

19. The mold device of claim 17, wherein the first plug and second plug are made of polytetrafluoroethylene, polyetheretherketone, stainless steel, aluminum or brass.

* * * * *